Dec. 15, 1942.     E. M. WISE ET AL     2,305,050
ELECTROFORMED ARTICLES
Filed Feb. 26, 1940     2 Sheets-Sheet 1

INVENTORS
EDMUND M. WISE
RAYMOND F. VINES
BY
A. D. Weller
ATTORNEY

INVENTORS
EDMUND M. WISE
RAYMOND F. VINES
BY
ATTORNEY

Patented Dec. 15, 1942

2,305,050

UNITED STATES PATENT OFFICE 2,305,050

ELECTROFORMED ARTICLE

Edmund M. Wise, Westfield, and Raymond F. Vines, Garwood, N. J., assignors to The International Nickel Company, Inc., New York, N. Y., a corporation of Delaware Application February 26, 1940, Serial No. 320,850

10 Claims. (Cl. 204—7)

The present invention relates to electroformed articles and, more particularly, to a process for electroforming articles including mirrors and searchlight reflectors, especially reflectors having high reflectivity and resistant to severe corrosive conditions.

The prior art processes for producing mirrors and searchlight reflectors have certain inherent disadvantages which hinder or prevent the deposition of a sufficiently thick, corrosion resisting precious metal electroplate to insure freedom from porosity and thus to obtain the required degree of protection. For example, if a sufficient thickness of platinum metal plate is deposited to obtain adequate corrosion resistance, the reflecting surface is rough and dull and must be polished to raise the reflectivity to the required minimum. This is a costly operation, removes some precious metal and destroys the contour of the reflecting surface and in some cases, as in reproducing gratings, is impossible. Another disadvantage of the prior art processes is the inability inherent in them to produce satisfactory rhodium surfaced palladium plated reflectors owing to the fact that when rhodium is deposited upon palladium the co-deposited hydrogen causes puckering and roughening of the underlying palladium plate, thus impairing the smoothness of the reflecting surface.

Furthermore, where a highly polished base metal or silver reflecting surface is to be protected by electro-depositing a non-tarnishing noble metal upon it, difficulty is encountered in securing adherence to the very smooth surface and the plating baths must be restricted to those of the low metal ion type in an effort to reduce local galvanic effects which would roughen the base metal and impair the adherence and continuity of the noble metal deposit.

In prior efforts to secure better corrosion resistance various metals such as gold, palladium and the like have been deposited upon the base metal and then the final reflecting surface, generally rhodium, was applied by electrodeposition but even such composite coatings have proved inadequate for marine use particularly in submarines, so recourse has been made to reflectors of highly corrosion resistant high chromium content alloys which are not only difficult to forge, grind and polish and hence are very expensive, but possess inferior reflectivity. Glass reflectors are unsuitable for this application because of their fragility and vulnerability to even small projectiles.

From the foregoing it will be readily appreciated that the art has failed to provide a process whereby mirrors may be electro-formed to have a precious metal surface of such thickness as to provide the corrosion resistance necessary to meet the rigorous requirements of marine use and at the same time provide the efficient reflecting surface necessary for such service. We have discovered that reflecting surfaces may be electro-formed to have a precious metal or platinum metal surface which meets the most rigorous requirements.

It is an object of the present invention to provide a process for electro-forming articles having a platinum metal surface.

It is another object of the present invention to provide a process for electro-forming articles having a precious metal reflecting surface capable of withstanding normal corrosive conditions for longer periods than prior art reflectors without appreciable reduction of the reflectivity thereof.

It is a further object of the present invention to provide a process for electro-forming articles having a precious metal reflecting surface having a higher reflectivity in the unpolished state than prior electro-formed reflecting surfaces.

The present invention also contemplates the provision of a process for producing precious metal or platinum metal reflecting surfaces having high corrosion resistance sufficient to meet the requirements of marine use and having a reflectivity coefficient higher than is possible with alloys of high chromium content.

Other objects and advantages will become apparent from the following description taken in conjunction with the drawings in which, Figs. 1–5 are illustrative in a schematic manner of the steps in electro-forming reflecting surfaces according to one prior art process;

Electro-formed articles such as mirrors and reflectors have been fabricated according to the principles of prior art processes in the manner illustrated schematically in Figs. 1 to 10. In order to simplify the description of the prior art process and to facilitate the appreciation by those skilled in the art of the differences between the processes of the prior art and the steps of applicant's novel combination, the production of curved reflectors will be described.

Figure 1:
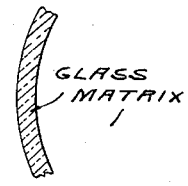
Figure 2:
Figure 3:
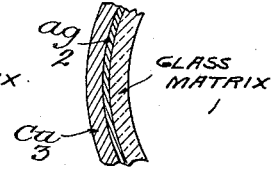
Figure 4:
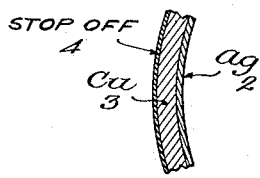
Figure 5:
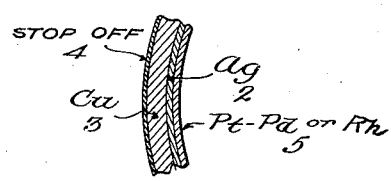
Figure 6:
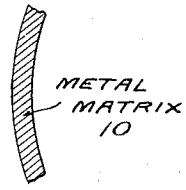
Figs. 6–10 are illustrative in a schematic manner of the steps in electro-forming reflective surfaces, according to a second prior art process.
Figure 7:
Figure 8:
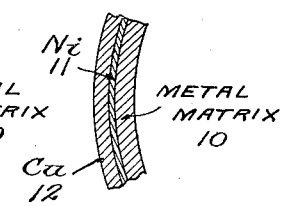

While fundamentally the prior art processes are the same with respect to the sequence of the steps thereof and the materials employed therein, the processes differ in the composition of the matrices or molds upon which the reflectors are built. Thus, in the process illustrated in Figures 1 to 5 a glass matrix 1 is provided with a thin silver layer 2 having a mirror-like surface as is clearly shown in Figure 2. This thin silver layer is deposited on the convex side of the glass matrix. Before stripping this thin silver surface from the mold a backing 3 of heavy base metal, such as copper or nickel, is deposited electrolytically (Fig. 3). The layers of metal 2 and 3, i. e. the copper or nickel layer and the thin silver layer, are then separated from the glass mold as is shown in Fig. 4. In this manner the base of the finished reflector is obtained in a condition in which the final reflecting surface may be deposited upon the exposed surface or concave side of the thin silver layer. The exposed surface of the copper or nickel layer is then provided with a stop-off layer 4 (Fig. 4) and a precious metal surface 5, applied to the silver surface preferably by electrodeposition. If attempts are made to provide precious metal coating thick enough to prevent corrosion, the electro-formed article thus produced by this prior art process then requires polishing before the reflectivity of the precious metal surface 5, is high enough to meet the requirements of industry. It will be appreciated that in the buffing and polishing operation precious metal is removed by attrition which necessitates the provision of means for recovering the valuable material.

In the second prior art process illustrated in Figs. 6 to 10, the highly polished metal matrix 10, is used as the base upon which the backing of the reflecting surface is formed. The procedure followed in producing the electro-formed article in accordance with the second prior art process is very similar to that of the prior art process described hereinbefore.

Figure 9:
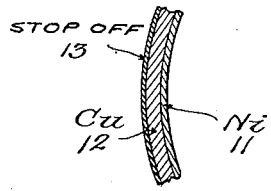
Figure 10:
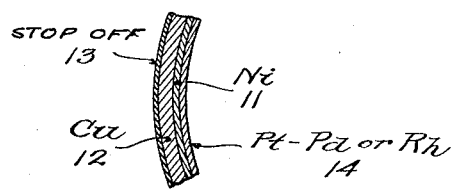

Thus a metal matrix having a highly polished convex side which is treated to permit easy removal of the subsequent plates is employed as the base or mold upon which the reflector is formed. A layer of nickel 11 (Fig. 7) is then electrodeposited upon the highly polished side of the matrix and upon this layer of nickel a heavy copper layer 12 (Fig. 8) is then electrodeposited. The composite shell thus formed i. e., the layer of nickel and the supporting heavy layer of copper, is stripped from the metal mold as illustrated in Fig. 9. The copper surface 12 is provided with a stop off layer 13 and the exposed surface of the nickel layer 11 coated with the thin film of precious metal 14 (Fig. 10).

The electro-formed article thus produced suffers from the same inherent disadvantages as that formed by the other prior art processes and furthermore, is subject to an additional deficiency as will be readily understood. From the foregoing description it is readily appreciated that the precious metal reflecting surface is deposited on a highly polished nickel surface. It is well known to those skilled in the art that it is extremely difficult to obtain satisfactory adherence of the precious metal layer to a highly polished nickel surface. Furthermore, local galvanic action occurs between the noble metals of the plating bath and the nickel plate. Consequently, the precious metal or platinum metal reflecting surface tends to lack continuity and to become progressively rougher if attempts are made to apply coatings of reasonable thickness thus destroying the perfection of the surface.

Broadly speaking, electrodeposits tend to become progressively rougher with increase in thickness. Difficulties also arise in the prior art processes due to galvanic effects occuring when a more noble metal is deposited on a less noble one. It is also to be noted that the adherence of successive layers of electrodeposited metals improves with increasing roughness of the surface to which the deposit is applied.

In the present invention all of the above factors are in optimum relation because the most noble metal of the final structure, is normally deposited first and upon the smoothest surface; while the subsequent plates of lower nobility are deposited upon progressively rougher surfaces. By this procedure a wide variety of plating baths are suitable and the thickness of the highly corrosion resistant layer or layers is limited only by cost and not by loss of smoothness, peeling or other limitations. On the other hand, in the prior art process the major corrosion resisting plate was applied to a very smooth, less noble surface and the final reflecting surface tended to become progressively rougher with the increase in the thickness of the protective plate and in some cases, particularly where palladium was used for the protective plate, the surface would suffer further roughening when the final reflective rhodium plate was applied—this aggravated roughness being due to hydrogen absorbed by the palladium during rhodium plating.

In the prior art processes, a glass or other matrix having a contour the reverse of that desired in the final product was employed. In contrast to previous practice the preferred embodiment of our invention employs a glass or metal matrix possessing the contour desired in the final product. This matrix of the desired contour, if of glass, is carefully cleaned and coated with a conducting layer such as silver deposited by the Brashear or other wet process, by vacuum sputtering or distillation, or by other convenient means and is then plated with copper from a standard copper sulphate bath (it may be remarked that cyanide baths appear less suitable as they are apt to damage the silver surface) to a thickness sufficient to avoid deformation when the electro-formed shape is removed from the matrix. After stripping the electroformed shape from the matrix the copper surface is protected with a stop-off and the surface which had been in contact with the glass matrix is plated with a thin layer of rhodium followed by a thicker layer of the major corrosion resisting metal, preferably platinum, palladium deposited from the complex nitrite or similar baths or from newly devised high metal ion high speed plating baths or gold deposited from a double cyanide bath. The corrosion resistant surface is then backed up by base metal deposits, generally copper and nickel in one or more layers, to provide the strength required in the final product. The stop-off is then removed from the preliminary electroform and an acid resistant stop-off is applied to the last deposited base metal surface. The preliminary electro-form is then removed by treatment with nitric acid or by electrolyzing it as anode in dilute sulphuric acid. When the stripping has been completed the rhodium reflecing surface will be exposed and will possess exactly the contour of the original matrix.

If platinum is used for the principal corrosion resisting layer and where its slightly lower reflectivity is suitable, the preliminary rhodium plate may be dispensed with or the thin rhodium plate may be applied to the platinum as a final operation. Final plating with rhodium cannot be done where palladium is used for the principal corrosion resisting surface as the hydrogen deposited along with the rhodium will cause slight puckering of the palladium thus impairing the micro flatness of the surface.

Metal matrices can also be used in which case the deposition of the initial conducting layer of silver or other metal may be dispensed with but generally the surface of the matrix will require surface treatment by one of the processes known to the art to prevent an excessively good bond developing on electroplating with copper or nickel. In the absence of such special treatments it is difficult or impossible to remove the preliminary electroformed shape without damaging it or the matrix. Further steps in the process are the same as described for a glass matrix.

It has not proved feasible to produce mirrors by depositing rhodium directly upon a metal matrix and then to deposit palladium or platinum followed by nickel and copper due to the difficulty of removing the composite from the metal matrix due to the excessively good bond developed between the rhodium and the metal matrix. However, this difficulty can be avoided by applying a thin nickel plate, preferably bright nickel to the matrix, the latter having been treated to prevent the formation of an excessively good bond. This thin nickel plate is then coated with rhodium, platinum, palladium or gold followed by a heavy nickel and copper plate. The composite is then stripped from the metal matrix and the thin nickel plate is then stripped off electrolytically or chemically as desired.

In order that those skilled in the art may have a better understanding of the principles of the present invention for the preparation of electroformed articles having high reflectivity without polishing, the preparation of a reflector which has given satisfactory results both from the standpoint of corrosion resistance and the standpoint of reflectivity will be described in conjunction with Figures 11 to 20.

Figure 11:
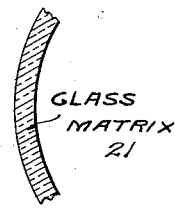
Figs. 11–20 are illustrative in a schematic manner of the steps in a process employing the principles of the present invention.
Figure 12:
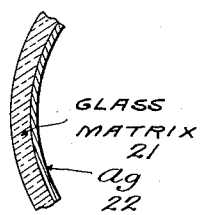
Figure 13:
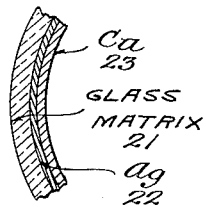
Figure 14:
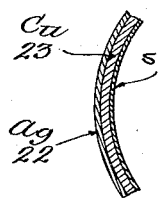
Figure 15:
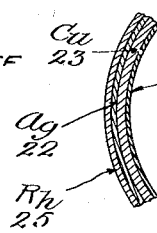
Figure 16:
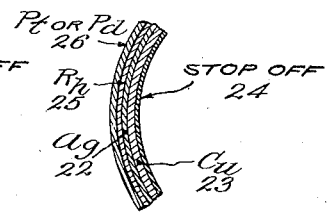
Figure 17:
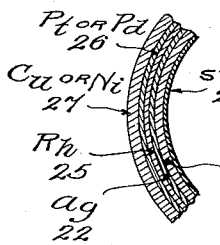
Figure 18:
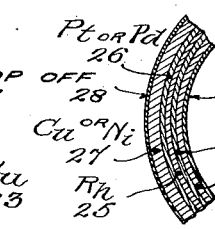
Figure 19:
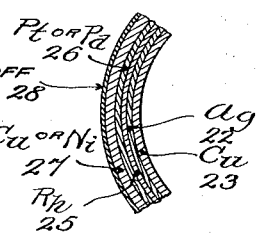
Figure 20:
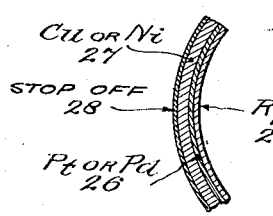

A matrix 21 Fig. 11 having the contour desired in the finished reflector is provided with a silver coating 22 on the reflecting or concave surface (Fig. 12). A copper layer 23 is then deposited upon the silver coating to provide an article with sufficient strength for handling in subsequent treatments (Fig. 13). The exposed concave surface of the copper is then protected with lacquer, wax or other stop-off 24, and the composite removed from the matrix (Fig. 14). Rhodium 25 which provides the ultimate reflecting surface is then deposited upon the convex silver surface 22 and backed up with a corrosion resistant layer of palladium or platinum 26 (Figs. 15 and 16). Nickel or copper or both 27, are then deposited upon the corrosion resistant layer 26 to provide the strength and rigidity required in the finished product (Fig. 17). After protecting the last deposited strengthening layer or layers 27 with wax, lacquer or other stop-off 28, (Fig. 18) the stop-off layer 24 is removed (Fig. 19) and the initial transitory silver and copper layers 22 and 23 then are removed with nitric acid or by electrolysis exposing the rhodium reflecting surface and thus completing the article (Fig. 20).

Plane mirrors can be made in a manner similar to the foregoing. For example, optically flat glass is silvered, copper plated on the silvered surface and the two layers are then removed from the glass. After "stopping off" the copper surface, rhodium, platinum or palladium or combinations thereof are deposited on the silver surface and the platinum metal layer or layers are stiffened by a backing of heavy copper or nickel plate. The initial stop-off layer is removed and the second heavy copper or nickel layer protected by a stop-off layer. The initial transitory layers of silver and copper are removed electrolytically in sulfuric acid after protecting the copper or nickel backing layer with a stop-off, which is a material resistant to the agent or agents employed to remove the initial silver and copper layers.

The preparation of the mold for the deposition of the initial silver layer may be carried out in any suitable manner but we prefer to polish a glass surface with suspension of chalk or other suitable agents and cotton, applying plenty of pressure to the cotton. Care must be exercised not to contaminate the glass surface by contact with greasy objects such as the hands of the operator. By the use of rubber gloves this difficulty is obviated. After polishing the glass mold is rinsed with water, immersed in a cleaning solution, such as 50% by volume nitric acid, and swabbed. It is rinsed again with water without removal therefrom. At this point we have found that, in accordance with accepted methods of preparing glass surfaces for the deposition of silver mirrors, it is advisable to swab the polished glass surface with a stannous chloride solution of say about 15% concentration. The polished glass is again rinsed with water without removal therefrom and finally rinsed with distilled water and allowed to stand just covered with water until ready for silvering. We have found that the inclusion of the step of treating the polished glass surface with stannous chloride solution improves the adherence of the silver film applied later.

A silver film is applied to the polished and cleaned glass surface in the usual manner employing a suitable silver solution such as that of Brashear or variations thereof. The silvered glass mold is then ready for the deposition of successive films as described hereinbefore.

We have found it advisable when depositing copper upon the silver film at room temperature to employ a high starting current of the order of about 50 amperes per square foot. We have also encountered difficulties when attempting to deposit palladium, platinum, rhodium or nickel or copper (from a cyanide copper solution) upon the silver film because there has been a tendency for the silver film to flake.

We have found that reflector surfaces comprising a film of platinum about 0.0005 inch thick gives satisfactory service while a reflector surface plated with 0.0005 inch of platinum and then finished with an electrodeposit of rhodium 0.000002 inch thick gives even higher reflectivity and very satisfactory service. However, we prefer to employ palladium about 0.0005 inch to about 0.002 inch thick, as the corrosion resisting layer which is surfaced with a film of rhodium about 0.000002 inch to about 0.000005 inch thick to provide the maximum reflectivity coupled with minimum cost.

In producing reflectors in accordance with the principles of the present invention the following baths have been used under the conditions set forth to plate nickel, copper, platinum, palladium and rhodium:

*Copper plating (for protective layer and for backing)*

| | Grams per liter |
|---|---|
| $CuSO_4.5H_2O$ | 240 |
| $H_2SO_4$ | 100 |
| Phenolsulfonic acid or similar brightening agent | 1 |

Agitated
C. D. at room temp. 50 amp./ft.$^2$.

*Nickel plating*

| | Grams per liter |
|---|---|
| $NiSO_4$ | 330 |
| $NiCl_2$ | 16.5 |
| $H_3BO_3$ | 30 |

4 c. c. of $H_2O_2$ (3%) per liter
Agitated
C. D. at 130° C. 50 amp./ft.$^2$.
pH (preferred) 2.2.

*Palladium plating (employing porous cell)*

Catholyte:

| | Grams per liter |
|---|---|
| Pd as diammino chloride | 15 |
| $NH_4Cl$ | 10 |
| $NH_3$ (free) | 5 |

Anolyte:

| | |
|---|---|
| $NH_4Cl$ (at start) | 10 |
| $NH_3$ (free) | 20 |

Agitated
Room temperature; C. D. 3 amps./ft.$^2$.

*Platinum plating*

| | Grams per liter |
|---|---|
| $(NH_4)_2HPO_4$ | 90 |
| $Na_2HPO_4$ | 120 |
| Pt (as chloro platinic acid) | 10 |

Add $NH_4OH$ and boil for some time; evaporation made up with 5% (by vol.) ammonia solution.

Agitated
Temp.: 90° C., C. D. 7 amps./ft.$^2$.

*Rhodium plating*

Baker's solution:

| | c. c./liter |
|---|---|
| No. 219 | 20 |
| $H_2SO_4$ (conc.) | 20 |

Agitated
Temp.: 40° C., C. D. 5 and 40 amps./ft.$^2$.

Although the present invention has been described in conjunction with certain preferred embodiments thereof, it is to be understood that variations and modifications thereof can be made as those skilled in the art will readily understand. Thus the expression precious metal or platinum metal includes gold, platinum, palladium, rhodium and iridium. Similarly, for copper and nickel may be substituted cobalt, or less desirably iron and iron-nickel alloys. Such variations and modifications are to be considered within the purview of the specification and the scope of the claims.

We claim:

1. A process for preparing electroformed reflectors having exceptionally high reflectivity combined with increased corrosion resistance especially under marine conditions which comprises electrodepositing a thin transitory layer of nickel upon a concave surface of suitable optical properties, said concave surface having been treated to facilitate the subsequent removal of said nickel without substantially affecting the optical properties of the convex surface of said nickel, electrodepositing a thicker layer of copper on the concave surface of said nickel, stripping said nickel and copper layers as a composite shell from said concave surface of suitable optical properties without substantially affecting the optical properties of the convex surface of said nickel, thereby obtaining a composite shell soluble in reagents in which the corrosion resistant concave reflecting surface of a subsequent electrodeposited article is insoluble and having a convex surface the exact complement of the aforesaid concave surface of suitable optical properties, electrically insulating the concave surface of said composite shell with a stop-off layer resistant to the components of the subsequent electroplating baths, electrodepositing a thin layer of rhodium upon the convex surface of said nickel, electrodepositing a thicker layer of another noble metal upon the convex surface of said rhodium, electrodepositing a layer of non-noble metal on the convex surface of said thicker layer of noble metal, said layer of non-noble metal being of sufficient thickness to form a supporting member for said rhodium and noble metal layers, and dissolving the composite shell from the concave surface of said rhodium layer whereby a rhodium plated corrosion resistant reflector having improved reflectivity and corrosion resistance is obtained.

2. A process for preparing electroformed articles having highly corrosion resistant precious metal surfaces which comprises depositing a transitory, thin layer of nickel on a surface of a matrix from which the aforesaid transitory layer may be removed without substantial reduction of the optical value of the subsequently exposed surface of said transitory layer, depositing a second thicker transitory layer of non-noble metal on the exposed surface of said thin metal layer, removing both transitory layers of non-noble metal from said matrix surface as an integral composite shell, protecting the exposed surface of said second transitory layer with a stop-off layer electrically insulating said surface and resistant to the components of electroplating baths subsequently to be employed, depositing a precious metal, selected from the group consisting of platinum, palladium, rhodium, gold, iridium and alloys thereof on the exposed surface of the thin transitory layer of said composite shell, depositing a substantially permanent layer of non-noble metal on the exposed surface of said precious metal in sufficient thickness to provide a support for said precious metal layer, protecting the exposed surface of said substantially permanent layer of non-noble metal with a stop-off layer of material resistant to the components of subsequent dissolving baths and stripping said transitory layers from said precious metal surface whereby an electroformed article is produced having a surface of improved optical character and improved corrosion resistance.

3. A process for preparing electroformed articles having highly corrosion resistant precious metal surfaces which comprises depositing a transitory, thin layer of nickel on a surface of a matrix from which the aforesaid transitory layer may be removed without substantial reduction of the optical value of the subsequently exposed surface of said transitory layer, depositing a second thicker transitory layer of non-noble metal on the exposed surface of said thin metal layer, removing both transitory layers of non-noble metal from said matrix surface as an integral composite shell, protecting the exposed surface of said second transitory layer with a stop-off layer electrically insulating said surface and resistant to the components of electroplating baths subsequently to be employed, depositing a precious metal, selected from the group consisting of platinum, palladium, rhodium, gold, iridium and alloys thereof on the exposed surface of the thin transitory layer of said composite shell, electro-depositing a substantially permanent layer of non-noble metal on the exposed surface of said precious metal in sufficient thickness to provide a support for said precious metal layer, and dissolving said composite shell from said precious metal surface whereby an electroformed article is produced having a surface of improved optical character and improved corrosion resistance.

4. A process for preparing electroformed reflectors having exceptionally high reflectivity combined with resistance to severely corrosive conditions which comprises preparing a preliminary electric current conducting electroform having a convex surface of a metal of the class consisting of silver and nickel and of suitable optical properties, electrodepositing a layer of rhodium about 0.000002 inch to about 0.000005 inch thick upon the aforesaid convex surface, electrodepositing a layer of palladium about 0.0005 inch to about 0.002 inch thick upon the exposed surface of the aforedescribed rhodium layer, electrodepositing on the exposed surface of said palladium at least one layer of at least one non-noble metal selected from the group consisting of copper, nickel and iron-nickel alloys in a thickness such as to protect the noble metal layers from deformation in final form, and dissolving the preliminary electroform to expose the aforedescribed rhodium surface having a higher reflectivity than prior art corrosion resistant metallic reflectors whereby an electroformed reflector is produced having a reflecting surface of higher reflectivity in the unpolished state than prior art reflectors, said reflecting surface being a layer of rhodium about 0.000002 inch to about 0.000005 inch thick, a corrosion resistant layer of palladium about 0.0005 inch to about 0.002 inch thick immediately beneath and intimately joined to said rhodium layer and at least one supporting layer of non-noble metal selected from the group consisting of copper, cobalt nickel and iron-nickel alloys in sufficient thickness to protect the aforesaid noble metal layers from deformation.

5. A process for preparing electroformed reflectors having exceptionally high reflectivity combined with resistance to severely corrosive conditions which comprises preparing a preliminary electrically conducting electroform readily soluble under conditions under which the reflector is not appreciably soluble and having an exposed mirror-surface of a metal of the class consisting of silver and nickel, electrodepositing at least one layer of a precious metal, selected from the group consisting of platinum, palladium, rhodium, gold, iridium and alloys thereof upon the mirror surface of said preliminary electroform, electrodepositing at least one thick supporting layer of metal upon the exposed surface of said precious metal, the metal of said supporting layer being selected from the group consisting of copper, nickel, cobalt, iron and iron-nickel alloys, and dissolving the preliminary electroform to expose the highly reflective surface of said precious metal layer and to provide a reflector having a reflecting surface resistant to severely corrosive conditions.

6. A process for preparing electroformed articles having exceptionally high reflectivity combined with resistance to severely corrosive conditions which comprises depositing a removable transitory layer of silver on the mirror surface of a matrix, electrodepositing a thicker layer of a base metal on the exposed surface of said silver to provide a preliminary electrically conducting electroform having a mirror surface of silver, stripping said electroform from said matrix, insulating the exposed surface of said base metal with a stop-off layer, electrodepositing a thin layer of rhodium on the exposed surface of the silver layer of said electroform to provide the reflecting surface of a reflector, electrodepositing a much thicker layer of a precious metal on the exposed surface of said rhodium to provide the principal corrosion resistance of said reflector, electrodepositing a layer of base metal on the exposed surface of said thicker layer of precious metal, said layer of base metal being sufficient to provide a supporting member for said precious metals, said rhodium layer, said precious metal layer and said base metal layer electrodeposited thereon providing an electroformed reflector and dissolving said preliminary electroform whereby an electroformed reflector having a highly reflective surface of rhodium and a much thicker layer of a precious metal providing the principal corrosion resistance is obtained.

7. A process for preparing electroformed reflectors having exceptionally high reflectivity combined with resistance to severely corrosive conditions which comprises preparing a preliminary electrically conducting electroform readily soluble under conditions under which the reflector is not appreciably soluble and having an exposed mirror surface of a metal of the class consisting of silver and nickel, electrodepositing a layer of platinum upon the mirror surface of said preliminary electroform, electrodepositing at least one thick supporting layer of base metal on the exposed surface of said platinum, said base metal being selected from the group consisting of copper, nickel, cobalt, iron and iron-nickel alloys, said platinum and said base metal forming a reflector, and dissolving said preliminary electroform whereby a reflector is obtained having a highly reflective platinum surface resistant to severely corrosive conditions.

8. A process for preparing electroformed reflectors having exceptionally high reflectivity combined with resistance to severely corrosive conditions which comprises preparing a preliminary electrically conducting electroform readily soluble under conditions under which the reflector is not appreciably soluble and having an exposed mirror surface of a metal of the class consisting of silver and nickel, electrodepositing a thin layer of rhodium upon the mirror surface of said preliminary electroform, electrodepositing at least one precious metal on the exposed surface of said rhodium to provide a much thicker layer of precious metal immediately beneath the highly reflective rhodium surface whereby the principal resistance to severely corrosive conditions is obtained, electrodepositing at least one layer of at least one base metal selected from the group consisting of copper, nickel, cobalt, iron and iron-nickel alloys upon the exposed surface of said thicker layer of precious metal in sufficient thickness to provide a supporting and protecting member therefor and dissolving said preliminary electroform.

9. A process for preparing electroformed reflectors having a highly reflective rhodium surface and having a relatively thick layer of palladium beneath and bonded to said rhodium surface to provide the principal resistance to severely corrosive conditions which comprises preparing a preliminary electrically conducting electroform readily soluble under conditions under which rhodium and palladium are substantially insoluble and having an exposed mirror surface of a metal of the class consisting of silver and nickel, electrodepositing a layer of rhodium at least about 0.000002 inch thick upon the exposed mirror surface of said preliminary electroform, electrodepositing a layer of palladium upon the exposed surface of said rhodium layer about 0.0005 inch to about 0.002 inch thick, electrodepositing on the exposed surface of said palladium at least one layer of at least one base metal selected from the group consisting of copper, nickel, cobalt, iron and iron-nickel alloys in a thickness such as to protect and support the precious metal layers, and dissolving the preliminary electroform to expose the aforesaid rhodium surface having an appreciably higher reflectivity than prior art corrosion resistant metallic reflectors.

10. A process for preparing electroformed reflectors having an exceptionally high reflectivity even in the unpolished condition combined with increased corrosion resistance especially to marine conditions which comprises preparing a preliminary electrically conducting electroform readily soluble under conditions under which the reflector is not appreciably soluble and having an exposed mirror surface of silver and a backing layer of electrodeposited base metal selected from the group consisting of copper and nickel, electrodepositing at least one thin layer of a precious metal, selected from the group consisting of platinum, palladium, rhodium, gold, iridium and alloys thereof upon the exposed mirror surface of said silver, electrodepositing at least one thick layer of a precious metal selected from the group consisting of gold, platinum and palladium on the exposed surface of said thin layer of precious metal, electrodepositing at least one layer of at least one base metal selected from the group consisting of copper, nickel, cobalt, iron and iron-nickel alloys on the exposed surface of said thick layer of electrodeposited precious metal in sufficient thickness to provide resistance to deformation of said precious metal layers, and dissolving said preliminary electroform.

EDMUND M. WISE.
RAYMOND F. VINES.